United States Patent
Kimura

(10) Patent No.: US 9,288,819 B2
(45) Date of Patent: Mar. 15, 2016

(54) COMMUNICATION CONTROL APPARATUS, COMMUNICATION SYSTEM, AND COMMUNICATION METHOD

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 13/923,817

(22) Filed: Jun. 21, 2013

(65) Prior Publication Data
US 2014/0057641 A1  Feb. 27, 2014

(30) Foreign Application Priority Data
Aug. 24, 2012 (JP) ................. 2012-185436

(51) Int. Cl.
| | |
|---|---|
| H04W 16/00 | (2009.01) |
| H04W 16/18 | (2009.01) |
| H04W 28/02 | (2009.01) |
| H04W 28/26 | (2009.01) |
| H04W 72/12 | (2009.01) |
| H04W 4/00 | (2009.01) |
| H04W 24/00 | (2009.01) |
| H04W 76/00 | (2009.01) |
| H04W 28/06 | (2009.01) |

(52) U.S. Cl.
CPC ............ H04W 72/1263 (2013.01); H04W 4/00 (2013.01); H04W 24/00 (2013.01); H04W 76/00 (2013.01); *H04W 28/06* (2013.01)

(58) Field of Classification Search
CPC ... H04W 36/32; H04W 64/00; H04W 64/006; H04W 4/046; H04W 52/367; G01S 5/12; G01S 13/84; G01S 19/52; G01S 2205/008; G01S 3/40

USPC .......... 455/436–443, 456.1–456.6, 457, 513, 455/524, 525, 133–135
See application file for complete search history.

(56) References Cited

U.S. PATENT DOCUMENTS

| | | | | |
|---|---|---|---|---|
| 6,539,300 | B2 * | 3/2003 | Myr ............................... | 701/117 |
| 2003/0233303 | A1 * | 12/2003 | Elazouni ........................ | 705/36 |
| 2006/0204218 | A1 * | 9/2006 | Matsumura ..................... | 386/83 |
| 2006/0291377 | A1 * | 12/2006 | Imaizumi ............. | H04L 1/0002 370/218 |
| 2007/0064633 | A1 * | 3/2007 | Fricke ..................... | H04L 29/06 370/310 |
| 2008/0118170 | A1 * | 5/2008 | Zhou et al. .................... | 382/251 |
| 2012/0015662 | A1 * | 1/2012 | Zhang et al. ................... | 455/445 |
| 2012/0314788 | A1 * | 12/2012 | Shi et al. ...................... | 375/260 |

FOREIGN PATENT DOCUMENTS

| | | |
|---|---|---|
| JP | 06-205071 A | 7/1994 |
| JP | 2005-056201 A | 3/2005 |
| JP | 2006-523984 A | 10/2006 |

* cited by examiner

*Primary Examiner* — Christopher M Brandt
*Assistant Examiner* — Ki Ha Nam
(74) *Attorney, Agent, or Firm* — Arent Fox LLP

(57) ABSTRACT

A communication control apparatus including: a processor configured to set each of starting time candidates for each of data communications performed by each of wireless communication apparatuses respectively, to estimate each of finishing time candidates for each of the data communications which corresponds to each of the starting time candidates, and to set each of starting times when each of wireless communication apparatuses is to start each of the data communications to each of the starting time candidates, by performing an optimization of a final finishing time candidate which is the final one of the finishing time candidates.

14 Claims, 13 Drawing Sheets

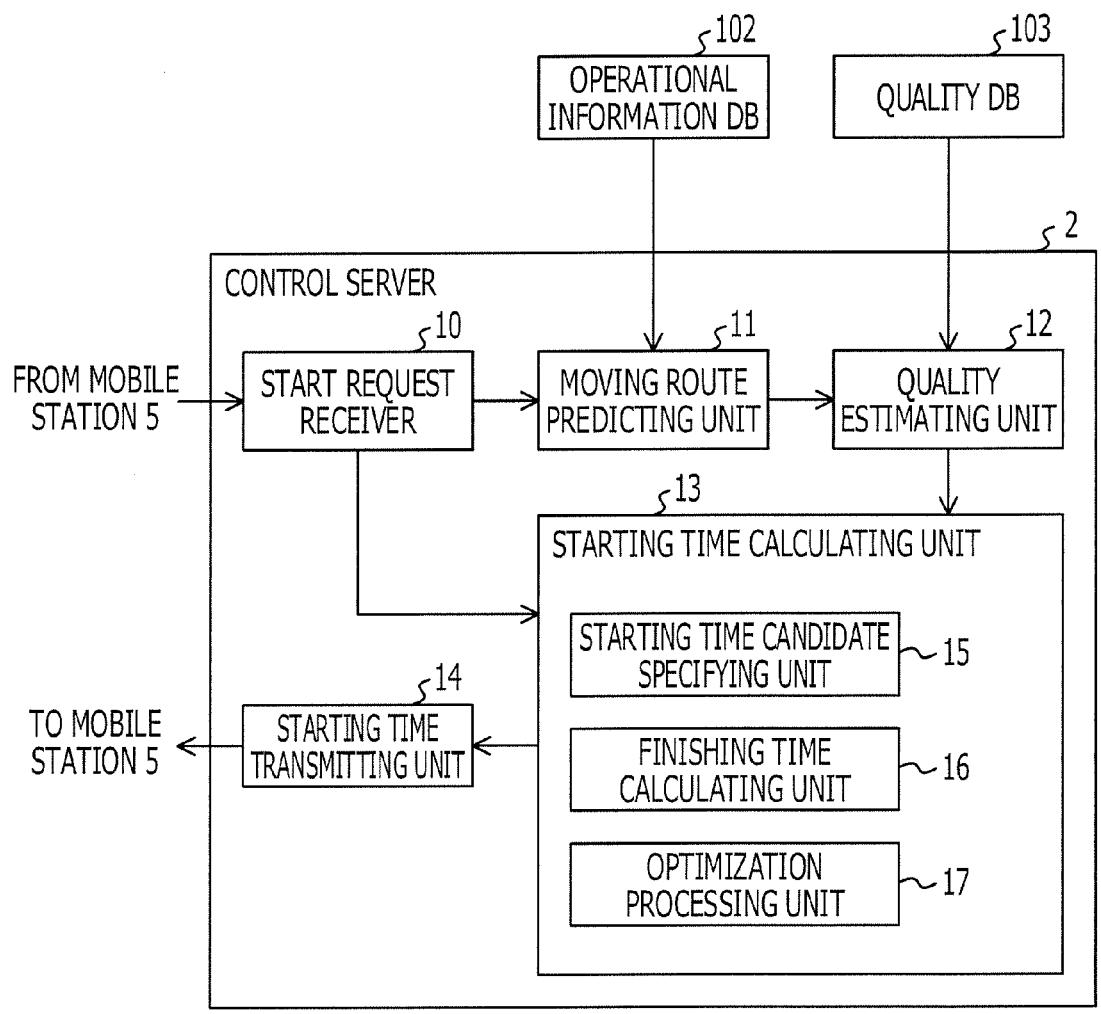

| LINE NAME | DISTANCE IN KILOMETERS | NORTH LATITUDE | EAST LONGITUDE |
|---|---|---|---|
| LINE A | 0km000m | 35.689753 | 139.700468 |
| LINE A | 0km500m | 35.681614 | 139.707831 |

| LINE NAME | TRAIN NUMBER | TIME | DISTANCE IN KILOMETERS |
|---|---|---|---|
| LINE A | 700H | 13 HOURS:00 MINUTE:00 SECOND | 0km000m |
| LINE A | 700H | 13 HOURS:00 MINUTE:20 SECOND | 0km500m |

| NORTH LATITUDE | EAST LONGITUDE | RECEPTION QUALITY |
|---|---|---|
| 35.689753 | 139.700468 | 22dB |
| 35.681614 | 139.707831 | 17dB |

# COMMUNICATION CONTROL APPARATUS, COMMUNICATION SYSTEM, AND COMMUNICATION METHOD

CROSS-REFERENCE TO RELATED APPLICATION

This application is based upon and claims the benefit of priority of the prior Japanese Patent Application No. 2012-185436, filed on Aug. 24, 2012, the entire contents of which are incorporated herein by reference.

FIELD

The embodiments discussed herein are related to a communication control apparatus that controls data transmission to a plurality of wireless communication apparatuses, a communication system, and a communication method.

BACKGROUND

In this type of communication system, a mobile station apparatus may freely travel within a cell of a base station apparatus or among cells, so reception quality with which the mobile station apparatus receives signals changes as the mobile station apparatus travels or a radio signal environment changes with time. If the reception quality is lowered, efficiency of data transmission to the mobile station apparatus, for example, is lowered. This may cease communication with the mobile station apparatus in some cases.

As a related technology, a data logging method is known that includes selection of one device from a plurality of devices and also includes calculation of a transfer period, including a starting time and a finishing time in log data transfer to a server, by using the transfer size of data to be transferred from the selected one device and a transfer period available to another device.

A known heterogeneous hybrid computer connecting system has a computer resource information manager that manages computing resource information, in which information about dynamic performance including the traffic status of a network is included, and also has a job scheduling manager that manages dynamic assignment of divided jobs to a plurality of computers according to the computing resource information and a request.

A known communication terminal apparatus includes a first estimated finishing time calculator that calculates a estimated communication finishing time taken in a case in which data communication is placed in a wait state until a planned number of channels to be used are all provided and the data communication is carried out by using the planned number of channels, a second estimated finishing time calculator that calculates a second estimated communication finishing time taken in a case in which if it is determined that a planned number of channels to be used are not all provided, data communication is immediately started by using only currently available channels, a selector that compares the two estimated communication finishing times and selects a communication mode in which the estimated communication finishing time comes earlier, and a controller that provides control so that data communication is carried out in the communication mode selected by the selector.

Japanese National Publication of International Patent Application No. 2006-523984 and Japanese Laid-open Patent Publication Nos. 2005-56201 and 6-205071 are examples of related art.

SUMMARY

According to an aspect of the invention, a communication control apparatus including: a processor configured to set each of starting time candidates for each of data communications performed by each of wireless communication apparatuses respectively, to estimate each of finishing time candidates for each of the data communications which corresponds to each of the starting time candidates, and to set each of starting times when each of wireless communication apparatuses is to start each of the data communications to each of the starting time candidates, by performing an optimization of a final finishing time candidate which is the final one of the finishing time candidates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of the functional structure of a control server apparatus;

DESCRIPTION OF EMBODIMENTS

In an example of a possible method of improving the efficiency of data transmission to a wireless communication apparatus, future reception quality at the wireless communication apparatus is estimated and data transmission to the wireless communication apparatus is executed and stopped according to the estimation result. In this method, however, a transmission starting time is determined according to the estimation result, so if a start of data transmission is delayed, a data transmission completion time may be delayed.

If a plurality of wireless communication apparatuses that receive data are present, data transmissions to these wireless communication apparatuses may be concurrently carried out. Then, data transmission operation may become inappropriate. For example, there may be a case in which reception qualities at a plurality of wireless communication apparatuses that receive data change similarly. This case may occur when, for example, a plurality of wireless communication apparatuses that receive data travel together by using a public transportation system or the like.

If the reception quality of the wireless communication apparatuses becomes good all at once, data transmission concentrates on the wireless communication apparatuses, lowering data reception speeds at individual wireless communication apparatuses. When the reception qualities of the wireless communication apparatuses are lowered, data transmission stops all at once, even if there are available wireless resources. Thus, the data transmission completion time may be delayed.

An object of the apparatus or method disclosed in the present disclosure is to control data transmission with transmission completion times taken into consideration when data items to be transmitted to a plurality of wireless communication apparatuses are concurrently present.

1. First Embodiment 1.1 Example of the Structure of a Communication System

Figure 1:
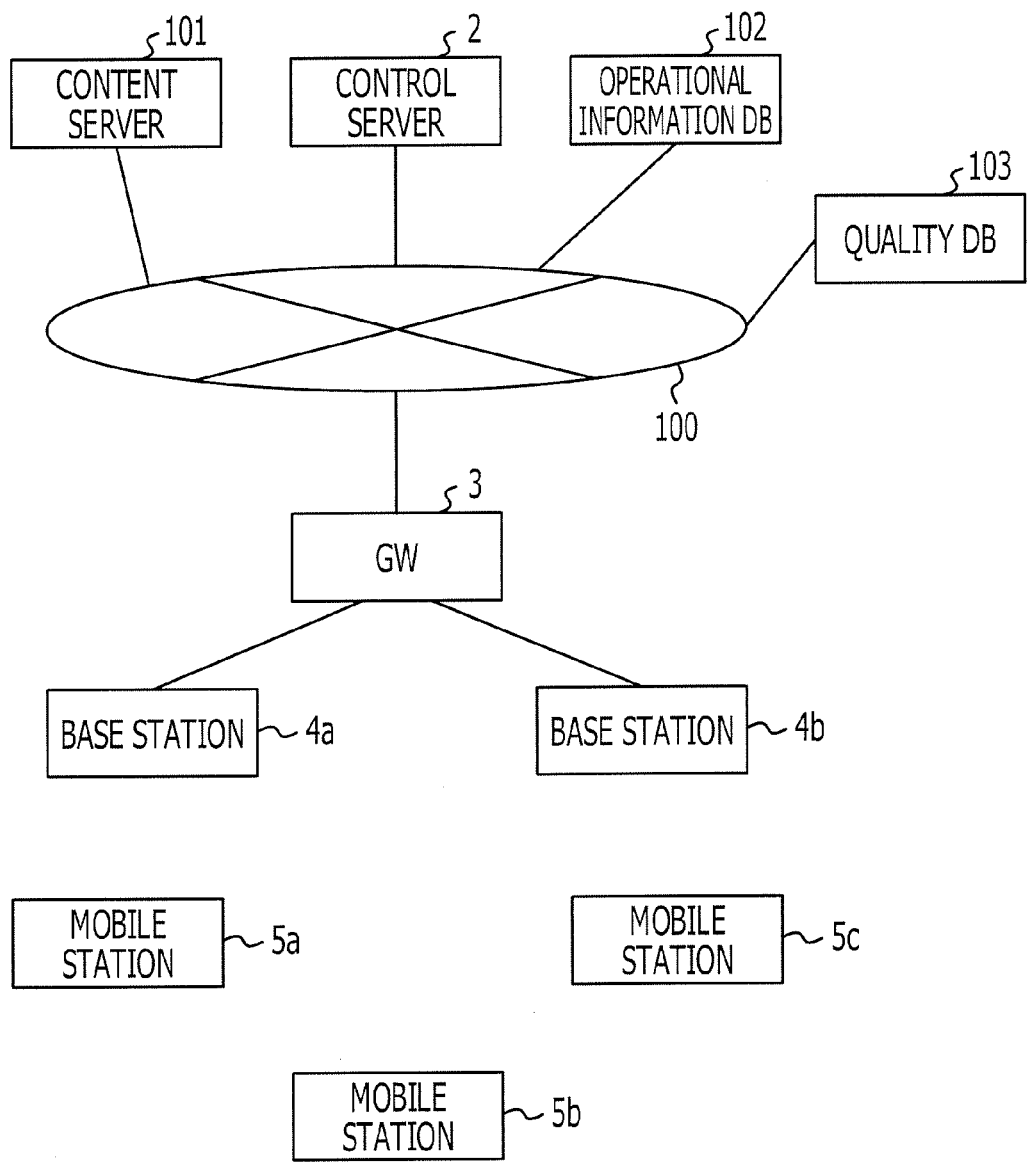
FIG. 1 illustrates an example of the structure of a communication system.

A preferred embodiment will be described below with reference to the attached drawings. FIG. 1 illustrates an example of the structure of a communication system. The communication system 1 includes a control server apparatus 2, a gateway apparatus 3, base station apparatuses 4a and 4b, and mobile station apparatuses 5a to 5c.

The control server apparatus 2 controls transmission starting times at which content data is to be distributed from a content server apparatus 101 to the mobile station apparatuses 5a to 5c. The content server apparatus 101 is a content distribution server apparatus that provides services through which website pages, news information, music, moving pictures, and other content data are distributed to the mobile station apparatuses 5a to 5c through a network 100. The content server apparatus 101 may be a server apparatus that supplies software and firmware operating in the mobile station apparatuses 5a to 5c. The control server apparatus 2 and content server apparatus 101 are connected to the gateway apparatus 3 through the network 100. The control server apparatus 2 is an example of a communication control apparatus, and the mobile station apparatuses 5a to 5c are examples of a wireless communication apparatus. The content data, software, and firmware distributed from the content server apparatus 101 to the mobile station apparatuses 5a to 5c are examples of data transmitted to a communication control apparatus.

In the description that follows and on the attached drawings, the control server apparatus, base station apparatus, mobile station apparatus, gateway apparatus, and content server apparatus may be referred to as the control server, base station, mobile station, GW, and content server, respectively. The base stations 4a to 4b may be collectively referred to as the base stations or base station 4. The mobile station apparatuses 5a to 5c may be collectively referred to as the mobile stations or mobile station 5.

The GW 3 is a network apparatus that relays communication among the control server 2, content server 101, and base stations 4. Each base station 4 forms a cell by transmitting a radio signal and performs data transmission and reception to and from a mobile station 5 located in the cell.

When the mobile station 5 is located in a cell formed by any one base station 4, the mobile station 5 can perform signal transmission and reception to and from the control server 2 and content server 101 through the base station 4. The mobile station 5 is a communication apparatus that can travel at appropriate times; the mobile station 5 may be, for example, a mobile telephone or a mobile information terminal apparatus. Although the base stations 4a and 4b and mobile stations 5a to 5c are illustrated in FIG. 1, the communication system 1 may include more base stations 4 and more mobile stations 5.

When determining a transmission starting time at which to transmit content data, the control server 2 predicts a moving route of the mobile station 5 and estimates reception quality of a signal that the mobile station 5 that will move along the predicted moving route will receive from the base station 4.

For example, the control server 2 estimates the moving route of the mobile station 5 that travels by using a transportation system, according to operational information about the transportation system. To receive operational information used to predict the moving route of the mobile station 5, the control server 2 may access an operational information database 102, which retains operational information about the transportation system, through the network 100, for example. In the description that follows and on the attached drawings, the database may be referred to as the DB. The operational information DB 102 may be connected to the control server 2 through a network different from the network 100. Alternatively, the operational information DB 102 may be disposed in the control server 2.

A quality DB 103 retains information about reception qualities of signals received from the base station 4 at positions in an area including a cell of the base station 4. The control server 2 may access the quality DB 103 through the network 100 and may receive information about reception qualities at positions at which the mobile station 5 traveling along the moving route will be present at future times. The quality DB 103 may be connected to the control server 2 through a network different from the network 100. Alternatively, the quality DB 103 may be disposed in the control server 2.

How the control server 2 predicts the moving route of the mobile station 5, estimates reception quality, and controls a transmission time at which to transmit content data will be described in more detail.

1.2 Functional Structure

FIG. 2 illustrates an example of the functional structure of the control server 2. The control server 2 includes a start request receiver 10, a moving route predicting unit 11, a quality estimating unit 12, a starting time calculating unit 13, and a starting time transmitting unit 14.

The start request receiver 10 receives a download start request signal transmitted from the mobile station 5. The download start request signal is a signal through which the mobile station 5 requests the content server 101 to start to download content data. The download start request signal may include positional information about the current position of the mobile station 5, size information that specifies the file size of the content data to be downloaded, and base station information about the base station 4 to which the mobile station 5 is being connected.

Figures 3A, 3B, 3C, 3D:
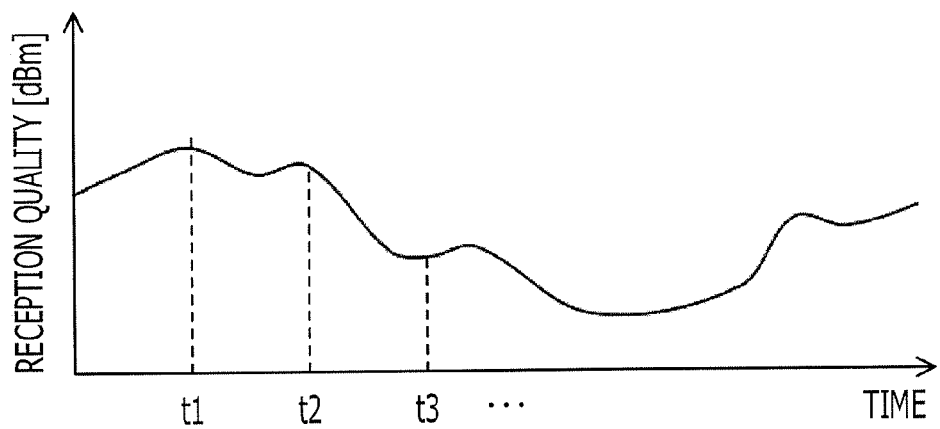
FIG. 3A illustrates an example of line information.
FIG. 3B illustrates an example of diagram information.
FIG. 3C illustrates an example of a quality database.
FIG. 3D illustrates reception quality estimated for a mobile station apparatus.

The moving route predicting unit 11 predicts the moving route of the mobile station 5 according to the positional information about the mobile station 5. An example of predicting a moving route according to the operational information retained in the operational information DB 102 will be described. The operational information DB 102 may include, for example, line information and diagram information as the operational information. FIG. 3A illustrates an example of line information, and FIG. 3B illustrates an example of diagram information. The information in FIGS. 3A and 3B are examples of operational information that is available when the transportation system is railroads.

The line information specifies coordinates at points on lines of the transportation system. For example, the line information may include the information elements "line name", "distance in kilometers", "north latitude", and "east longitude". The information element "line name" identifies a line of the transportation system. The information element "distance in kilometers" specifies a distance traveled from the origin of the line to a point on the line along the line. The information elements "north latitude" and "east longitude" specify a latitude and longitude, respectively, as coordinate information at a point on the line. For example, the second row in FIG. 3A indicates that the coordinates at a point 500 m apart from the origin of line A are latitude 35.681614 degrees north and longitude 139.707831 degrees east.

The diagram information specifies operational schedules of individual transportation apparatuses of the transportation system. For example, the diagram information may include the information elements "line name", "train number", "time", and "distance in kilometers". The information element "line name" identifies a line of the transportation system. The information element "train number" identifies an individual train. The information elements "time" and "distance in kilometers" respectively indicate a time planned for the train during running and a point at which the train is planned to be located at that time. For example, the second row in FIG. 3B indicates that the train with train number 700H on line A is planned to be at a position 500 m apart from the origin at 13 hours, 00 minutes, 20 seconds.

Referring again to FIG. 2, the moving route predicting unit 11 identifies a train that transports the mobile station 5 from, for example, the positional information, current time, line information, and diagram information provided for the mobile station 5. The moving route predicting unit 11 predicts positional information about the mobile station 5 at future times t1, t2, t3, and later from the diagram information and the coordinate information in the line information about the identified train as a future moving route.

To predict the moving route of the mobile station 5, the moving route predicting unit 11 may employ many methods other than the method in which operation information about the transportation system is used. The moving route predicting unit 11 may retain behavior histories of the user of the mobile station 5 and may predict a future moving route of the mobile station 5 from previous behavior histories. The moving route predicting unit 11 may receive a travel destination from the mobile station 5. The moving route predicting unit 11 may perform navigation processing in which a moving route from the current position of the mobile station 5 to the travel destination is calculated.

The quality estimating unit 12 estimates the reception quality of a signal that the mobile station 5 will receive from the base station 4 at different points on the moving route predicted by the moving route predicting unit 11. When estimating the reception quality, the quality estimating unit 12 references, for example, reception quality information that is retained in the quality DB 103 according to the position of the mobile station 5.

FIG. 3C illustrates an example of reception quality information retained in the quality DB 103. The reception quality information indicates reception qualities of signals received from base station 4 at positions in an area including a cell of the base station 4. The reception quality information may include the information elements "north latitude", "east longitude", and "reception quality". The information elements "north latitude" and "east longitude" is coordinate information that specifies a position. The information element "reception quality" specifies the reception quality of a signal received from the base station 4 at that position. The reception quality may be specified in, for example, signal-to-interference power ratio (SIR) format, received signal strength indication (RSSI) format, or a combination of these formats. For example, the second row in FIG. 3C indicates that reception SIR, which indicates reception quality, at a position with latitude 35.681614 degrees north and longitude 139.707831 degrees east is 17 dB.

The reception quality information may be created by accumulating reception qualities in a database together with measured positions, the reception qualities being measured by an operator who operates the communication system 1 and the mobile station 5 included in the communication system 1. Alternatively, the reception quality information may be calculated from the position of the base station 4, an antenna height, an antenna angle, transmission power, and geographic information in the cell.

The quality estimating unit 12 estimates the reception quality of the mobile station 5 traveling along the moving route at a future time by, for example, taking a correspondence between the predicted moving route of the mobile station 5 and the coordinate information in the quality DB 103. FIG. 3D schematically illustrates reception quality estimated for the mobile station 5. The quality estimating unit 12 estimates the reception quality of the mobile station 5 at future times t1, t2, t3, and later.

Referring again to FIG. 2, the starting time calculating unit 13 calculates a download starting time at which to start to download content data to the mobile station 5 that has transmitted a download start request signal. The starting time calculating unit 13 includes a starting time candidate specifying unit 15, a finishing time calculating unit 16, and an optimization processing unit 17.

Of a plurality of mobile stations 5 that receive content data from the content server 101, the starting time candidate specifying unit 15 identifies a set of mobile stations 5, (i=1, 2, ..., Nu) at which content data destined for the mobile stations 5 are combined in a common wireless resource. The symbol Nu indicates a total number of mobile stations $5_i$ included in this set. An example of a set of mobile stations $5_i$ is a set of mobile stations 5 that are connected to the same base station 4 and receive content data from the content server 101. The starting time candidate specifying unit 15 may identify a set of mobile stations $5_i$ according to, for example, base station information, included in the download start request signal, about the base station 4 to which the mobile station 5 is being connected. A set of mobile stations measured by the starting time candidate specifying unit 15 will be referred to below as a plurality of mobile stations.

The starting time candidate specifying unit 15 specifies a plurality of download starting time candidates for each of a plurality of mobile stations $5_i$. The plurality of starting time candidates specified for each of mobile stations $5_1, 5_2, \ldots, 5_{Nu}$ will be collectively referred to as starting time candidates $d_1, d_2, \ldots, d_{Nu}$.

The starting time candidate specifying unit 15 specifies a plurality of starting time candidate combinations $d^\wedge(=d_1, d_2, \ldots, d_{Nu})$ by combining a plurality of starting time candidates specified for each of $5_1, 5_2, \ldots, 5_{Nu}$.

The finishing time calculating unit 16 calculates predicated throughputs $\theta_1(t)$ to $\theta_{Nu}(t)$ bps/Hz for the plurality of $5_1$ to $5_{Nu}$ at future time t according to the reception quality estimated by the quality estimating unit 12 for the plurality of $5_1$ to $5_{Nu}$.

In a case in which mobile stations $5_1, 5_2, \ldots, 5_{Nu}$ start a download at starting time candidates $d_1$ to $d_{Nu}$ included in the starting time candidate combinations $d\hat{\ }(=(d_1 \text{ to } d_{Nu}))$, download finishing times at the mobile stations $5_1, 5_2, \ldots, 5_{Nu}$ will be denoted $T_1(d\hat{\ })$ to $T_{Nu}(d\hat{\ })$. Since the download finishing time depends on the download starting time, finishing times $T_1(d\hat{\ })$ to $T_{Nu}(d\hat{\ })$ are each a function of the starting time candidate combination $d\hat{\ }$. The finishing time calculating unit 16 calculates finishing times $T_1(d\hat{\ })$ to $T_{Nu}(d\hat{\ })$ for the specified plurality of starting time candidate combinations $d\hat{\ }$.

The finishing times $T_1(d\hat{\ })$ to $T_{Nu}(d\hat{\ })$ satisfy equation (1) below.

$$B\int_{d_i}^{T_i(d\hat{\ })}\theta_i(t)/N(t)dt=S_i (i=1,2,\ldots,N_u) \quad (1)$$

In equation (1), B indicates the system bandwidth of a wireless access network between the base station 4 and the mobile station 5, Si is the download size of remaining content data, and N(t) is a total number of mobile stations $5_i$ that are executing a download at time t, N(t) being given by equation (2) below.

$$N(t) = \sum_{i=1}^{Nu} f(t-d_i)f(T_i(d\hat{\ })-t) \quad (2)$$

The function f(x) is a step function, the value of which is 1 when x is greater than or equal to 0, and 0 when x is smaller than 0.

Equation (1) is used when wireless resources are evenly assigned to mobile stations $5_i$. In an embodiment in which different amount of wireless resources are assigned to different mobile stations $5_i$, the left side of equation (1) may be multiplied by a coefficient suitable to these differences.

When equations (1) and (2) are quantized by a discrete time (one second interval in these equations), they are rewritten as equations (3) and (4) below.

$$B \sum_{n=d_i}^{T_i(d\hat{\ })-1} \theta_i(n)/N(n) = S_i \quad (3)$$
$$(i = 1, 2 \ldots, N_u)$$

$$N(n) = \sum_{i=1}^{Nu} f(n-d_i)f(T_i(d\hat{\ })-1-n) \quad (4)$$

With time discretely advancing, the finishing time calculating unit 16 determines whether a download at mobile stations $5_1$ to $5_{Nu}$ has been finished according to equations (3) and (4) to calculate finishing times $T_1(d\hat{\ })$ to $T_{Nu}(d\hat{\ })$.

The optimization processing unit 17 solves an optimization problem, determined according to a desired download method, of an objective function of finishing time $T_i(d\hat{\ })$ calculated by the finishing time calculating unit 16 to determine download starting time $d_1$ at which to start a download at mobile station $5_i$. To comprehensively move up download finishing times $T_i(d\hat{\ })$ at all mobile stations $5_i$, for example, it suffices to select the starting time candidate combination $d\hat{\ }$ by which an objective function C ($d\hat{\ }$) represented by equation (5) below is minimized as download starting time $d_i$ at each mobile stations $5_i$.

$$C(d\hat{\ }) = \sum_{i=1}^{N_u} T_i(d\hat{\ }) \quad (5)$$

The objective function C ($d\hat{\ }$) in equation (5) represents the sum of download finishing times $T_i(d\hat{\ })$ at all mobile stations $5_i$. That is, the objective function C ($d\hat{\ }$) in equation (5) represents the sum of times each of which is a time from a certain reference time of day to time $T_i(d\hat{\ })$ at which a download is finished at each of all mobile stations $5_i$.

The starting time transmitting unit 14 transmits download starting time $d_i$, at each mobile stations $5_i$, determined by the optimization processing unit 17 to relevant mobile stations $5_i$.

Figure 4:
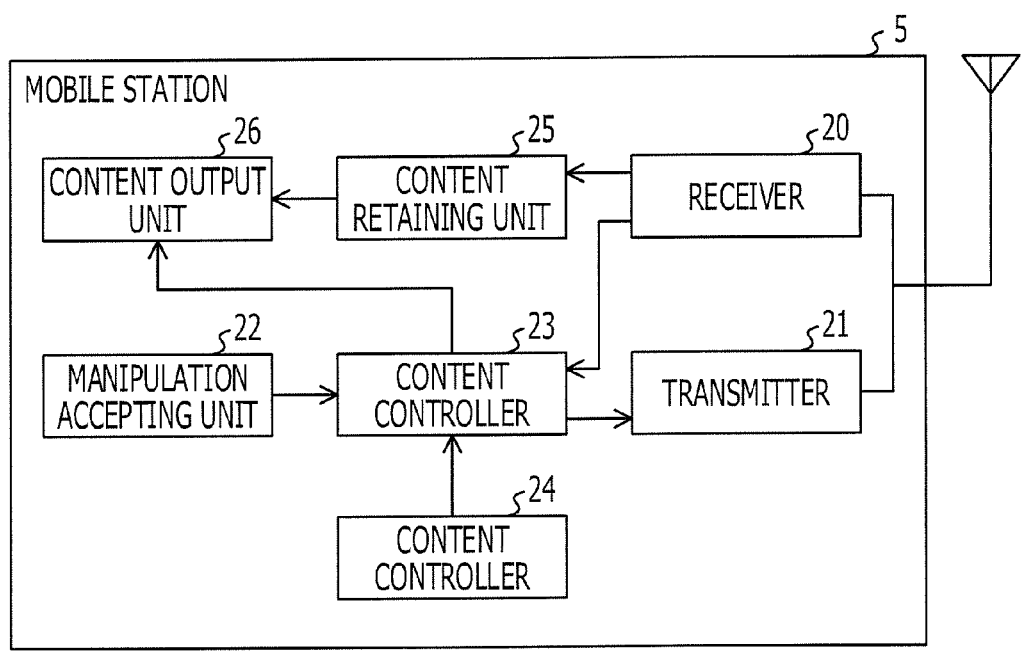
FIG. 4 illustrates an example of the functional structure of a mobile station apparatus.

Next, the functions of the mobile station 5 will be described. FIG. 4 illustrates an example of the functional structure of the mobile station 5. The mobile station 5 includes a receiver 20, a transmitter 21, a manipulation accepting unit 22, a content controller 23, a positional information obtaining unit 24, a content retaining unit 25, and content output unit 26.

The receiver 20 receives an outbound link signal transmitted from the base station 4 through an antenna, after which the receiver 20 demodulates and decodes the outbound link signal. The outbound link signal includes content data transmitted from the content server 101 through the base station 4 and also includes information that specifies a time at which to start to download the content data, the information being transmitted from control server 2 through the base station 4. The receiver 20 outputs the received content data to the content retaining unit 25 and also outputs the information about the download starting time to the content controller 23.

The transmitter 21 encodes and modulates an inbound link signal and sends the modulated signal to the base station 4 through the antenna. The inbound link signal includes a download start request signal that is transmitted to the control server 2 through the base station 4. The inbound link signal also includes a download request signal that is transmitted to the content server 101 through the base station 4. The download request signal is a signal through which the mobile station 5 requests the content server 101 to transmit content data. Upon receipt of the download request signal, the content server 101 starts to transmit content data. The transmitter 21 receives the download start request signal and download request signal from the content controller 23 and transmits the download start request signal and download request signal to the control server 2 and content server 101, respectively, as inbound signals.

The manipulation accepting unit 22 accepts a command manipulation performed by the user for the mobile station 5. The manipulation accepting unit 22 may be, for example, a keyboard, buttons, a touch panel, a microphone, or another information input device attached to the mobile station 5. The content controller 23 creates a download start request signal, which is used to receive content data, in response to a command entered by the user through the manipulation accepting unit 22, and outputs the created signal to the transmitter 21. As described above, the download start request signal includes positional information that specifies the current position of the mobile station 5, size information that specifies the file size of content data to be downloaded, and base station information about the base station 4 to which the mobile station 5 is being connected.

The content controller 23 receives positional information about the mobile station 5, which is transmitted as a download start request signal, from the positional information obtaining unit 24. The positional information obtaining unit 24 obtains the current position of the mobile station 5 and outputs positional information indicting the current position to the content controller 23. An example of the positional information obtaining unit 24 may be a Global Positioning System (GPS) device or an inertial navigation device.

When the content controller 23 receives, from the control server 2, starting time information that specifies a time at which to start to download content data, the content controller 23 monitors the arrival of the download starting time specified in the starting time information. When the download starting time comes, the content controller 23 outputs a download request signal to the transmitter 21.

Upon receipt of the download request signal, the transmitter 21 sends it to the content server 101. The content server 101 starts to transmit content data to the receiver 20 in response to the received download request signal. The content data received by the receiver 20 is stored in the content retaining unit 25. The content retaining unit 25 may have a hard disk drive, a memory, or another information storage device to retain content data.

The content output unit 26 outputs content data to be stored in the content retaining unit 25 in response to a command entered by the user through the manipulation accepting unit 22. The content output unit 26 may have a display device on which visual content data, for example, is displayed. The content output unit 26 may have a speaker or another audio signal device from which, for example, acoustic content data is output.

1.3 Explanation of Operation

Figure 5:
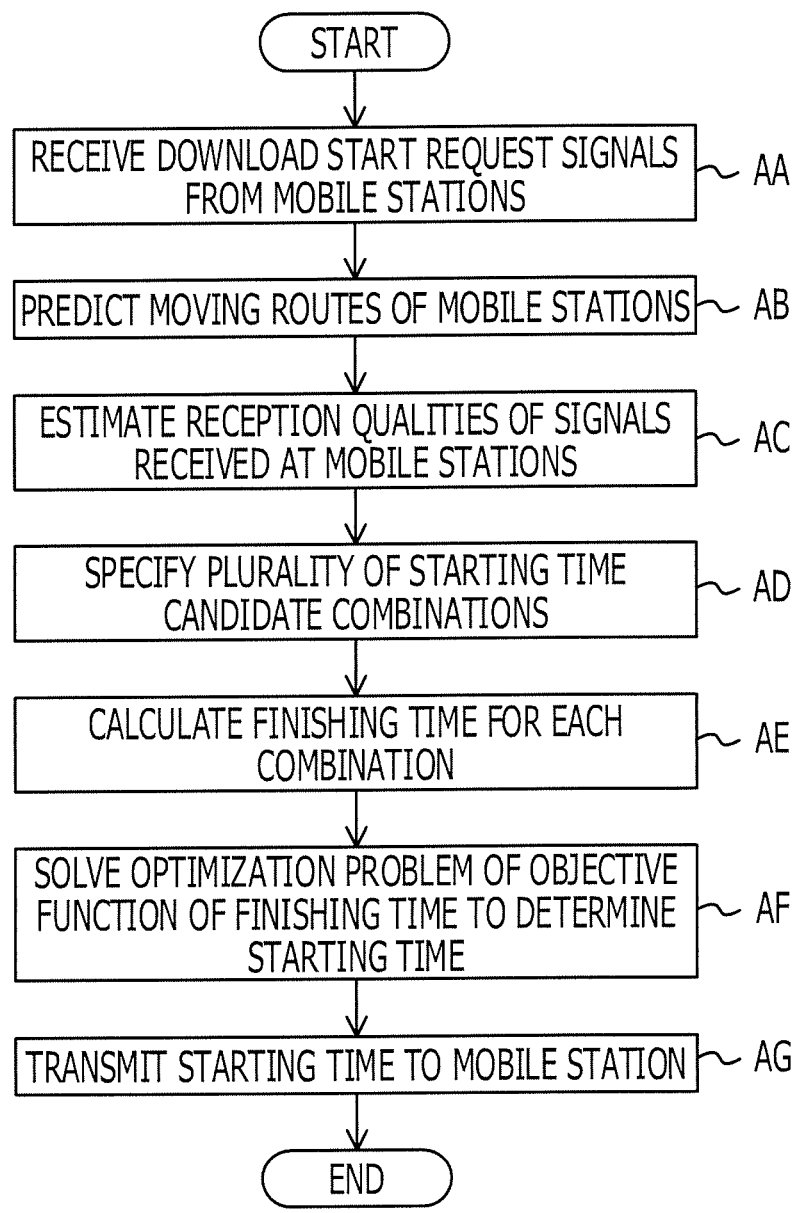
FIG. 5 illustrates a first example of the operation of a control server apparatus.

Next, the operations of the control server 2 and mobile station 5 will be described. FIG. 5 illustrates a first example of the operation of the control server 2.

In operation AA, the start request receiver 10 receives download start request signals from a plurality of mobile stations $5_i$. In operation AB, the moving route predicting unit 11 predicts the moving routes of the plurality of mobile stations $5_i$ from positional information about the plurality of mobile stations $5_i$. In operation AC, the quality estimating unit 12 estimates reception qualities of signals that the plurality of mobile stations $5_i$ will receive from their relevant base stations 4 at future times.

In operation AD, the starting time candidate specifying unit 15 specifies a plurality of download starting time candidates for each of the plurality of mobile stations $5_i$. The starting time candidate specifying unit 15 combines the plurality of starting time candidates specified for each of the plurality of mobile stations $5_1, 5_2, \ldots, 5_{Nu}$ and specifies a plurality of starting time candidate combinations $d^\wedge (=(d_1, d_2, \ldots, d_{Nu}))$.

In operation AE, the finishing time calculating unit 16 calculates finishing times $T_1(d^\wedge)$ to $T_{Nu}(d^\wedge)$ for each of the specified plurality of starting time candidate combinations $d^\wedge$. In operation AF, the optimization processing unit 17 determines starting time $d_1$ at which each mobile station $5_i$ starts a download by solving the optimization problem of the objective function of finishing time $T_1(d^\wedge)$. In operation AG, the starting time transmitting unit 14 transmits, to each mobile station $5_i$, starting time $d_1$, determined by the optimization processing unit 17, at which each mobile station $5_i$ starts a download.

Figure 6:
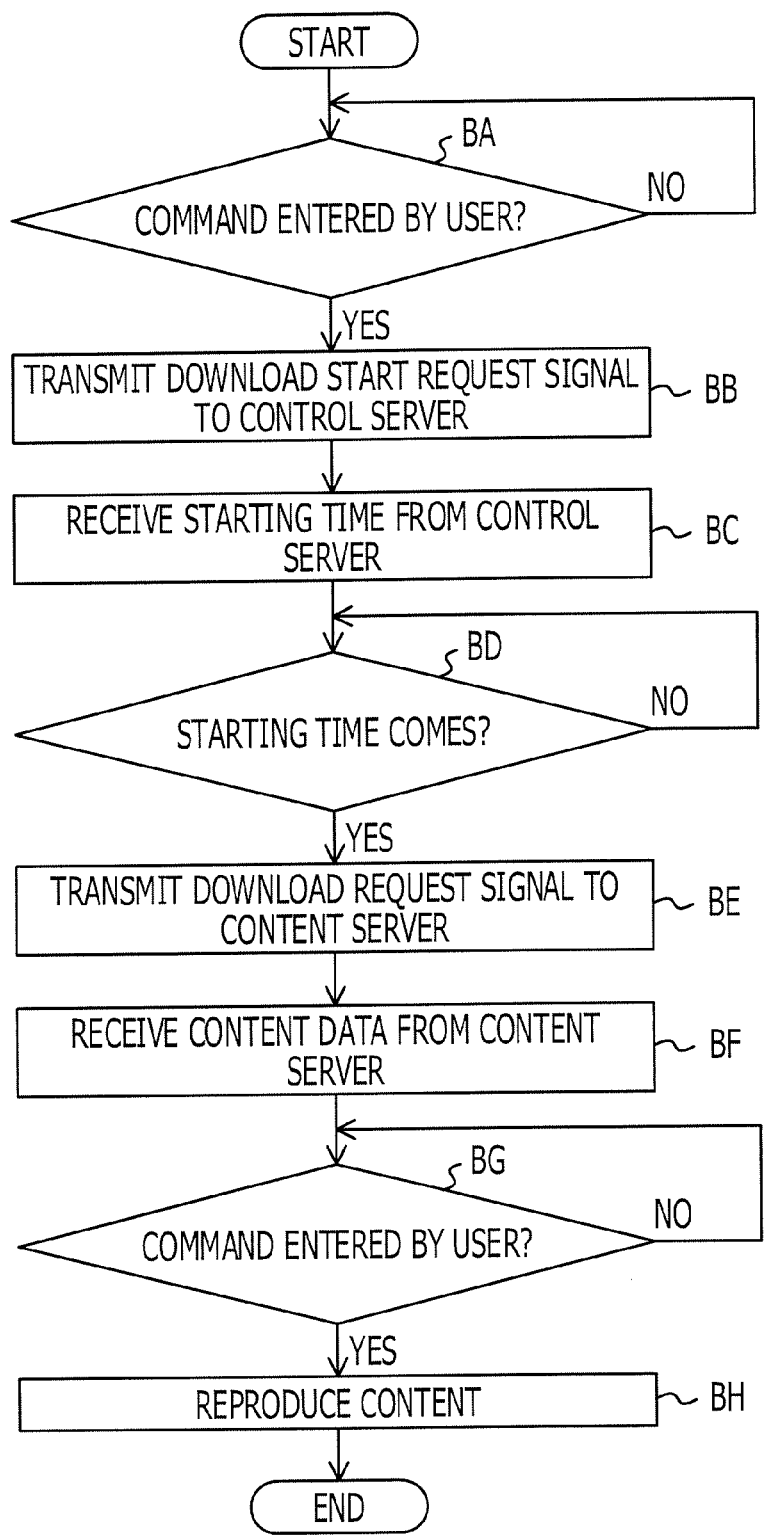
FIG. 6 illustrates an example of the operation of the mobile station apparatus.

Next, an example of the operation of the mobile station 5 will be described with reference to FIG. 6. In operation BA, the content controller 23 decides whether a command to download content data has been entered by the user from the manipulation accepting unit 22. If a download command has been entered (the result in operation BA is Yes), the operation proceeds to operation BB. If a download command has not been entered (the result in operation BA is No), the operation returns to operation BA.

In operation BB, the content controller 23 creates a download start request signal and outputs it to the transmitter 21. The transmitter 21 receives the download start request signal and transmits it to the control server 2 through the base station 4 and GW 3.

In operation BC, the content controller 23 receives, from the control server 2, starting time information that specifies a time at which to start to download content data. In operation BD, the content controller 23 decides whether the download starting time specified in the starting time information has come. If the download starting time has arrived (the result in operation BD is Yes), the operation proceeds to operation BE. If the download starting time has not come (the result in operation BD is No), the operation returns to operation BD.

In operation BE, the content controller 23 transmits a download request signal to the transmitter 21. The transmitter 21 receives the download request signal and outputs it to the content server 101 through the base station 4 and GW 3. In operation BF, the receiver 20 receives content data from the content server 101. The content data received by the receiver 20 is stored in the content retaining unit 25.

In operation BG, the content controller 23 decides whether a command to reproduce content data has been entered by the user from the manipulation accepting unit 22. If a reproduction command has been entered (the result in operation BG is Yes), the operation proceeds to operation BH. If a reproduction command has not been entered (the result in operation BG is No), the operation returns to operation BG. In operation BH, the content controller 23 causes the content output unit 26 to output content data to be stored in the content retaining unit 25.

1.4 Advantageous Effects

In this embodiment, a download starting time is determined by solving the optimization problem of the objective function of a download finishing time at the mobile station 5. Accordingly, it is possible to optimize a download operation in consideration of a download finishing time. With equation (5) above, a download operation is controlled so that a download is finished at the mobile station 5 at the earliest time.

In this embodiment, a download starting time is determined by solving the optimization problems of the objective functions of download finishing times $T_1(d^\wedge)$ to $T_{Nu}(d^\wedge)$ at a plurality of mobile stations $5_1$ to $5_{Nu}$. Accordingly, it is possible to optimize a download operation in consideration of concurrent downloads among the plurality of mobile stations $5_1$ to $5_{Nu}$. With equation (5) above, a download operation is controlled so that all download finishing times $T_i(d^\wedge)$ at the plurality of mobile stations $5_1$ to $5_{Nu}$ come comprehensively early.

1.5 Variation

As the objective function of download finishing time $T_i(d^\wedge)$ used to determine download starting time $d_i$, various functions can be used according to a desired download method. To improve download efficiency by minimizing the amount of wireless resources used for a download, for example, it suffices to select the starting time candidate combination $d^\wedge$ that minimizes the objective function $C(d^\wedge)$ represented by equation (6) as download starting time $d_i$.

$$C(d\hat{}) = \sum_{i=1}^{N_u} D_i(d\hat{}) \quad (6)$$

$D_i(d\hat{})$ (=$T_i(d\hat{})-d_i$) represents a period from a download starting time to a download finishing time, that is, a download execution time, and the objective function $C(d\hat{})$ in equation (6) indicates the sum of download execution times taken at all mobile stations $5_i$. Accordingly, when the objective function $C(d\hat{})$ in equation (6) is minimized, the sum of download execution times taken at all mobile stations $5_i$ is minimized, so the amount of wireless resources to be used is minimized.

To optimize the starting time so that download times at a plurality of mobile stations $5_i$ do not exceed their allowable finishing time $T_{max, i}$, the starting time candidate combination $d\hat{}$ that minimizes the objective function $C(d\hat{})$ in equation (7) may be selected as download starting time $d_i$.

$$C(d\hat{}) = \sum_{i=1}^{N_u} g(T_i(d\hat{}) - T_{max,i}) \quad (7)$$

The function $g(x)$ may be a function that takes 0 when x is smaller than or equal to 0 and is a monotone increasing function of x when x is greater than 0. For example, the function $g(x)$ may be a ramp function that takes 0 when x is smaller than or equal to 0 and takes x when x is greater than 0. The objective function $C(d\hat{})$ in equation (7) represents a product obtained by multiplying a difference by the function $g(T_i(d\hat{})-T_{max, i})$ for each of all mobile stations $5i$, the difference being obtained by subtracting threshold $T_{max, i}$ from download finishing times $T_i(d\hat{})$.

When the objective function $C(d\hat{})$ in equation (7) is minimized, if download finishing times $T_i(d\hat{})$ at all mobile station $5_i$ are smaller than or equal to allowable finishing time $T_{max, i}$, they are minimized to 0. Accordingly, download starting time $d_i$ is optimized so that the download finishing time at each of a plurality of mobile stations $5_i$ does not exceed the relevant allowable finishing time $T_{max, i}$.

Although, in this embodiment, the control server 2 and content server 101 are different server apparatuses, this is not a limitation; the control server 2 and content server 101 may be a single server apparatus in another embodiment.

2. Second Embodiment

2.1 Explanation of Operation

Next, another embodiment of the communication system 1 will be described. It is now assumed that after the optimization processing unit 17 had already determined download starting times $d_1$ to $d_{Nu}$ at mobile stations $5_1$ to $5_{Nu}$, new mobile station $5_{Nu+1}$ has transmitted a download start request signal. In this description, a mobile station for which download starting time $d_1$ has already been determined is referred to as a mobile station in the downloading state.

In a certain embodiment, download starting times $d_1$ to $d_{Nu}$ at mobile stations $5_1$ to $5_{Nu}$ may be recalculated together with download starting time $d_{Nu+1}$ at new mobile station $5_{Nu+1}$ by the determination method described above in the first embodiment. In this case, a mobile station, of mobile stations $5_1$ to $5_{Nu}$ in the downloading state, at which a download is actually being carried out may suspend the download and then may restart the download at a starting time that is newly determined after the suspension.

In the second embodiment, only download starting time $d_{Nu+1}$ at new mobile station $5_{Nu+1}$ is optimized without changing download starting times $d_1$ to $d_{Nu}$ at mobile stations $5_1$ to $5_{Nu}$ in the downloading state.

The starting time candidate specifying unit 15 specifies a plurality of download starting time candidates $d_{Nu+1}$ at new mobile station $5_{Nu+1}$. Since the download finishing times at mobile stations $5_1$ to $5_{Nu}$, $5_{Nu+1}$ change depending on the download starting time at new mobile station $5_{Nu+1}$, the finishing time is a function of starting time candidate $d_{Nu+1}$. The download finishing times at mobile stations $5_1$ to $5_{Nu}$, $5_{Nu+1}$ will be denoted $T_1(d_{Nu+1})$ to $T_{Nu}(d_{Nu+1})$, $T_{Nu+1}(d_{Nu+1})$, respectively.

With time discretely advancing, the finishing time calculating unit 16 determines whether a download at mobile stations $5_1$ to $5_{Nu}$, $5_{Nu+1}$ has been finished according to equations (8) and (9) to calculate finishing times $T_1(d_{Nu+1})$ to $T_{Nu}(d_{Nu+1})$, $T_{Nu+1}(d_{Nu+1})$.

$$B \sum_{n=d_i}^{T_i(d_{Nu+1})-1} \theta_i(n)/N(n) = S_i \quad (8)$$

$$(i = 1, 2 \ldots, N_u + 1)$$

$$N(n) = \sum_{i=1}^{Nu+1} f(n-d_i)f(T_i(d_{Nu+1})-1-n) \quad (9)$$

The optimization processing unit 17 determines download starting time $d_{Nu+1}$ at new mobile station $5_{Nu+1}$ by solving the optimization problem of the objective function of finishing time $T_1(d_{Nu+1})$. For example, the optimization processing unit 17 may select starting time candidate $d_{Nu+1}$ by which the objective function $C(d_{Nu+1})$ in equation (10) below is minimized as download starting time $d_{Nu+1}$ at new mobile station $5_{Nu+1}$. As in equation (5) above, the objective function $C(d_{Nu+1})$ in equation (10) below represents the sum of download finishing times at all mobile stations $5_1$ to $5_{Nu}$, $5_{Nu+1}$. An objective function as in equations (6) and (7) above may be used in the second embodiment.

$$C(d_{Nu+1}) = \sum_{i=1}^{N_u+1} T_i(d_{Nu+1}) \quad (10)$$

Figure 7:
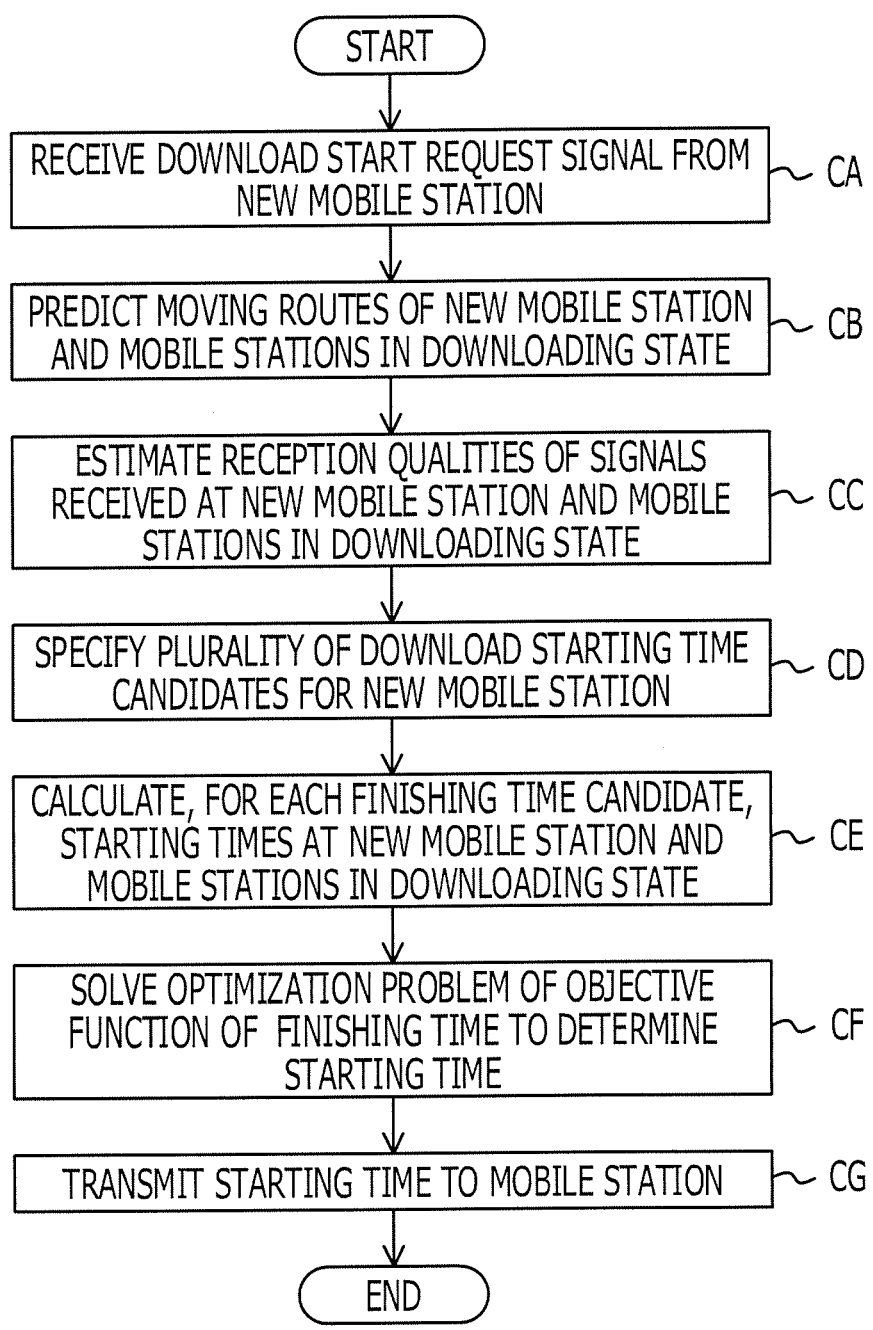
FIG. 7 illustrates a second example of the operation of the control server apparatus.

The operation of the control server 2 in the second embodiment will be described with reference to FIG. 7. It is assumed here that download starting times $d_1$ to $d_{Nu}$ at mobile stations $5_1$ to $5_{Nu}$ have been determined before operation CA described below is executed.

In operation CA, the start request receiver 10 receives a download start request signal from new mobile station $5_{Nu+1}$. In operation CB, the moving route predicting unit 11 predicts the moving routes of a plurality of mobile stations $5_1$ to $5_{Nu+1}$. In operation CC, the quality estimating unit 12 estimates reception qualities of signals that the plurality of mobile stations $5_1$ to $5_{Nu+1}$ will receive from their relevant base stations 4 at future times. The reception quality at mobile stations $5_1$ to $5_{Nu}$, which had been estimated when download starting times $d_1$ to $d_{Nu}$ at mobile stations $5_1$ to $5_{Nu}$ had been determined before operation CA as been executed, may be stored in, for example, the quality estimating unit 12. If the reception qualities at mobile stations $5_1$ to $5_{Nu}$, which had been estimated before operation CA has been executed, can be used, the predicting of the motion paths of mobile stations $5_1$ to $5_{Nu}$ and the estimation of reception qualities at mobile stations $5_1$ to $5_{Nu}$ may be omitted in operations CB and CC.

In operation CD, the starting time candidate specifying unit 15 specifies a plurality of download starting time candidates $d_{Nu+1}$ for new mobile station $5_{Nu+1}$. In operation CE, the finishing time calculating unit 16 calculates finishing times $T_1(d_{Nu+1})$ to $T_{Nu+1}(d_{Nu+1})$ for each of the specified plurality of starting time candidates $d_{Nu+1}$.

In operation CF, the optimization processing unit 17 determines starting time $d_{Nu+1}$ at which new mobile station $5_{Nu+1}$ starts a download by solving the optimization problem of the objective function of finishing time $T_1(d_{Nu+1})$. In operation CG, the starting time transmitting unit 14 transmits download starting time $d_{Nu+1}$ determined by the optimization processing unit 17 to new mobile station $5_{Nu+1}$.

2.2 Example of Operation

Next, an example of an operation state when a download is controlled according to the second embodiment will be described by making a comparison with a case in which download starting times are not controlled and a case in which download starting times are controlled in another method. It is assumed here that two mobile stations 5a and 5b, which are connected to the same base station 4, start to download content data.

Figure 8A:
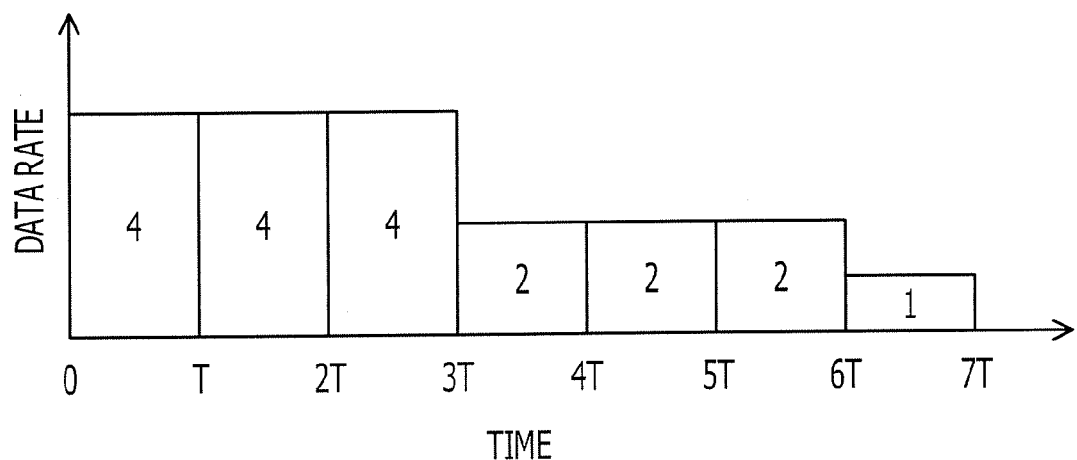
FIGS. 8A and 8B illustrate expected data rates at two mobile station apparatuses.
Figure 8B:
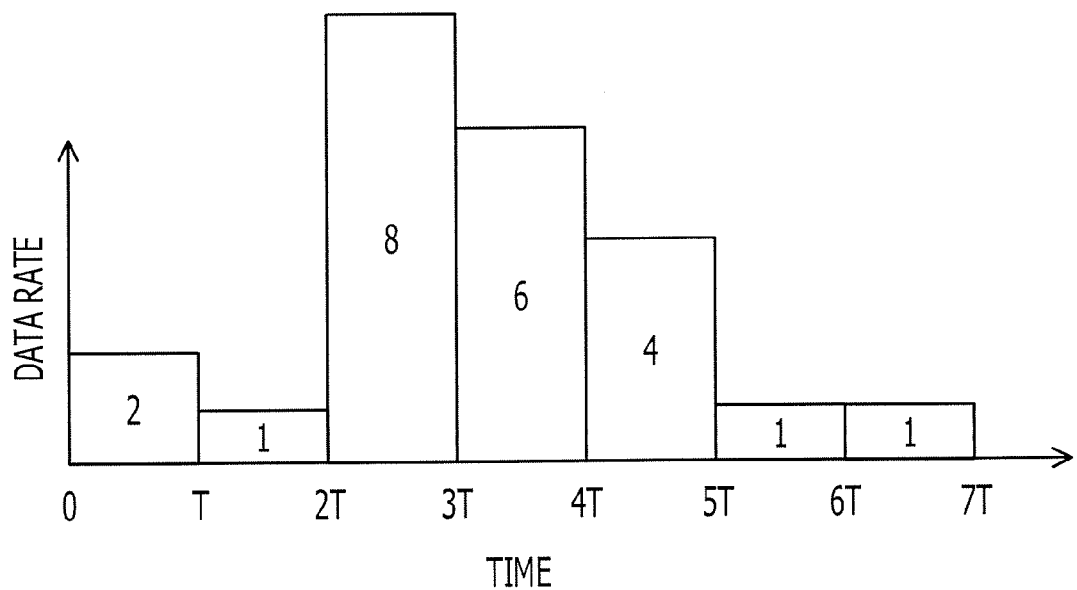

FIGS. 8A and 8B illustrate expected data rates at the mobile stations 5a and 5b. The expected data rates in FIGS. 8A and 8B are represented as a value relative to the amount of data that can be transmitted in a time interval T. The expected data rates at the mobile station 5a in a period from times 0 to T, in a period from times T to 2T, in a period from times 2T to 3T, in a period from times 3T to 4T, in a period from times 4T to 5T, in a period from times 5T to 6T, and in a period from times 6T to 7T are 4, 4, 4, 2, 2, 2, and 1, respectively.

The expected data rates at the mobile station 5b in a period from times 0 to T, in a period from times T to 2T, in a period from times 2T to 3T, in a period from times 3T to 4T, in a period from times 4T to 5T, in a period from times 5T to 6T, and in a period from times 6T to 7T are 2, 1, 8, 6, 4, 1, and 1, respectively. If wireless packets are transmitted at intervals of about 1 ms, the time interval T may be longer than the wireless packet transmission interval; for example, the time interval T may be on the order from one second to several minutes.

Download finishing times at the mobile stations 5a and 5b will be compared, assuming that a value relative to the amount of data downloaded at the mobile station 5a is 12 and a value relative to the amount of data downloaded at the mobile station 5b is 10 and that the mobile station 5a generates a content data download request at time 0 and mobile station 5b generates it at time T.

2.2.1 Case in which Download Starting Times are Not Controlled

Figure 9A:
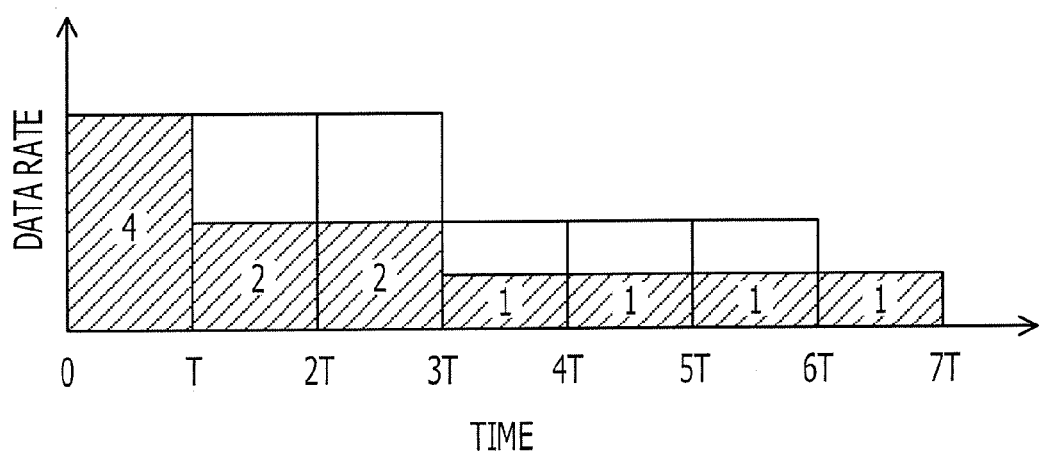
FIGS. 9A and 9B illustrate an example of actual data rates at the two mobile station apparatuses.
Figure 9B:
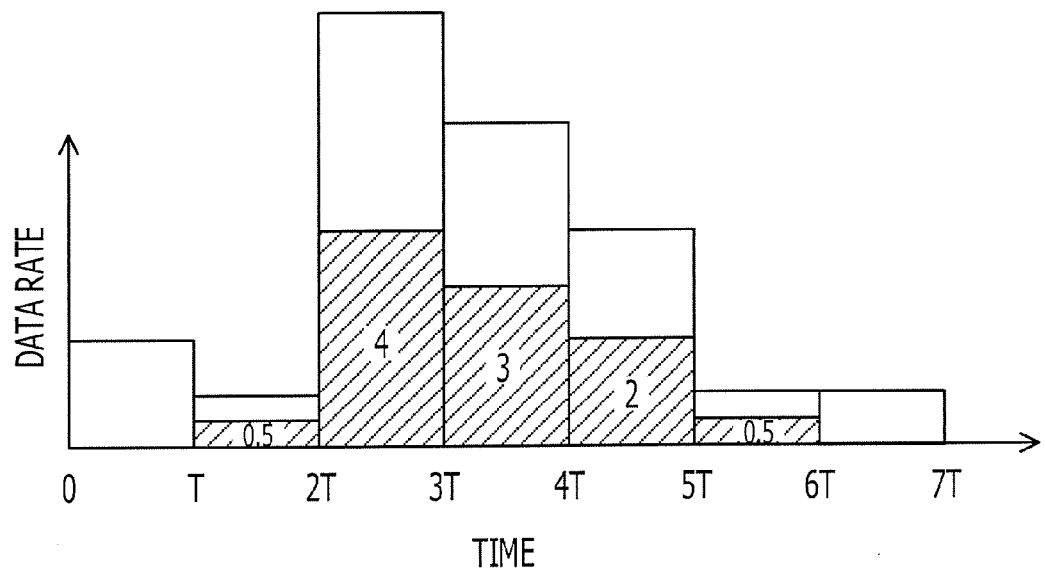

FIGS. 9A and 9B illustrate an example of actual data rates at the mobile stations 5a and 5b in a case in which download starting times are not controlled. When download starting times are not controlled, the mobile stations 5a and 5b start a download at times 0 and T, respectively.

In a period from times 0 to T and a period from times 6T to 7T, during which only the mobile station 5a is executing a download, the data rates at the mobile station 5a are the same as the expected data rates 4 and 1. In periods during which both the mobile stations 5a and 5b are executing a download, if wireless resources are assumed to be evenly divided between the mobile stations 5a and 5b, the actual data rate becomes half of the expected data rate. Accordingly, in a period from times T to 2T, in a period from times 2T to 3T, in a period from times 3T to 4T, in a period from times 4T to 5T, and in a period from times 5T to 6T, during which the mobile stations 5a and 5b concurrently executes a download, the data rate at the mobile station 5a becomes half of the expected data rate. Specifically, the data rates at the mobile station 5a in a period from times T to 2T, in a period from times 2T to 3T, in a period from times 3T to 4T, in a period from times 4T to 5T, and in a period from times 5T to 6T becomes 2, 2, 1, 1, and 1, respectively.

Similarly, the data rates at the mobile station 5b in a period from times T to 2T, in a period from times 2T to 3T, in a period from times 3T to 4T, in a period from times 4T to 5T, and in a period from times 5T to 6T becomes 0.5, 4, 3, 2 and 0.5, respectively. As a result, a time at which the mobile station 5a completes the downloading of content data by a data amount of 12 is 7T. A period during which the mobile station 5a continues downloading is 7T. By contrast, a time at which the mobile station 5b completes the downloading of content data by a data amount of 10 is 6T. A period during which the mobile station 5b continues downloading is 5T.

Figure 10A:
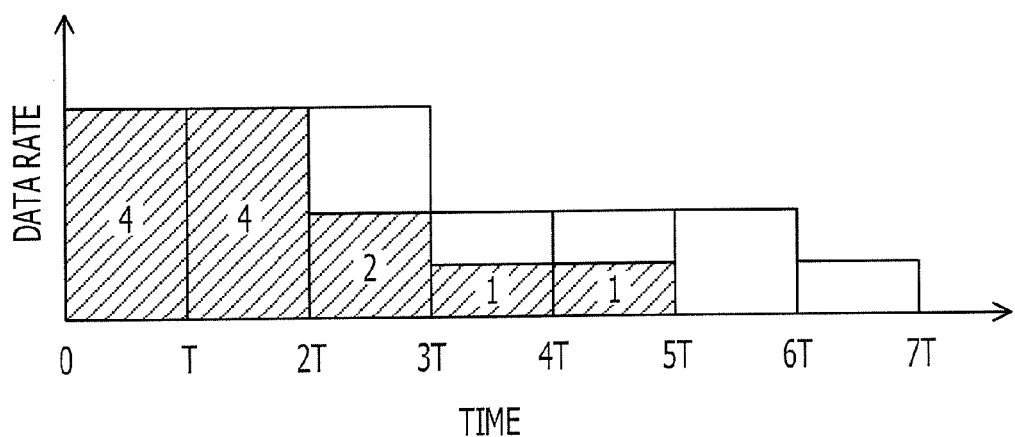
FIGS. 10A and 10B illustrate another example of actual data rates at the two mobile station apparatuses.
Figure 10B:
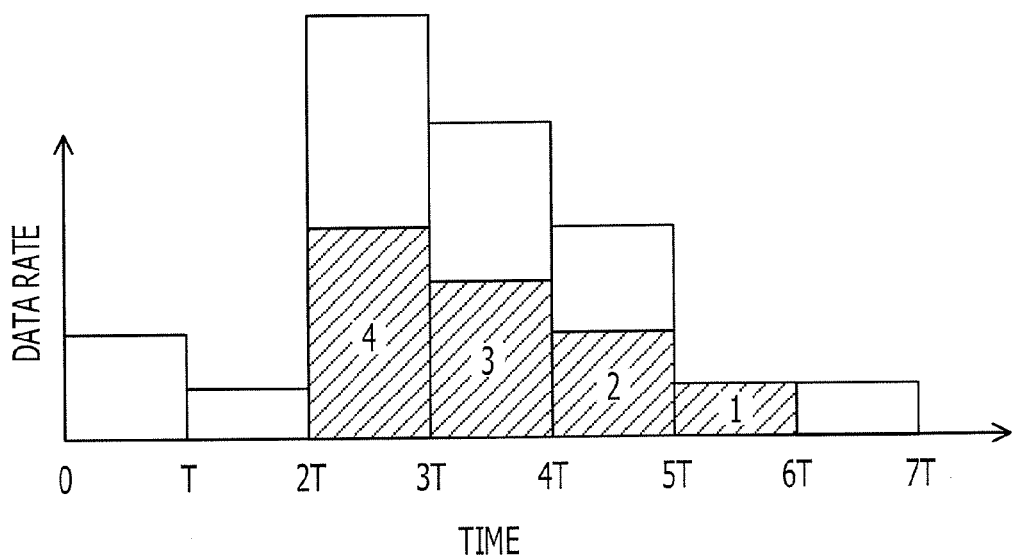

2.2.2 Case in which the Download Starting Time is Independently Controlled for Each Mobile Station Next, it will be assumed that download starting times at the mobile stations 5a and 5b are individually controlled. FIGS. 10A and 10B illustrate an example of actual data rates at the mobile stations 5a and 5b when download starting times at the mobile stations 5a and 5b are individually controlled.

In this example, the download starting time is controlled so that a download is started in a period in which the expected data rate at the mobile station is maximized. Therefore, a download at the mobile station 5a is started at time 0 and a download at the mobile station 5b is started at time 2T. As a result, the download at the mobile station 5a is finished at time 5T, and a period during which the mobile station 5a continues downloading is 5T. By contrast, the download at the mobile station 5b is finished at time 6T, and a period during which the mobile station 5b continues downloading is 4T.

In comparison with the case in which the download starting time is not controlled, the download finishing time and the download period at the mobile station 5a have been improved from 7T to 5T. However, the download finishing time at the mobile station 5b has not been improved; that time stays at 6T.

Figure 11A:
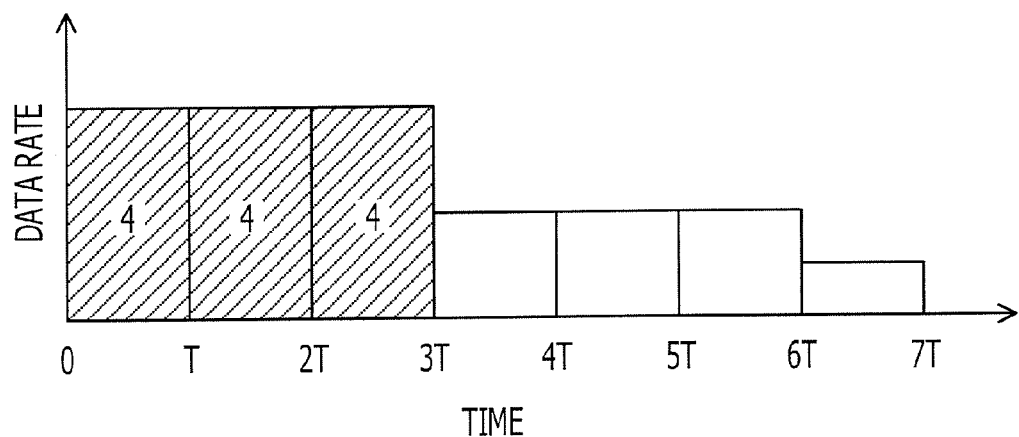
FIGS. 11A and 11B illustrate another example of actual data rates at the two mobile station apparatuses.
Figure 11B:
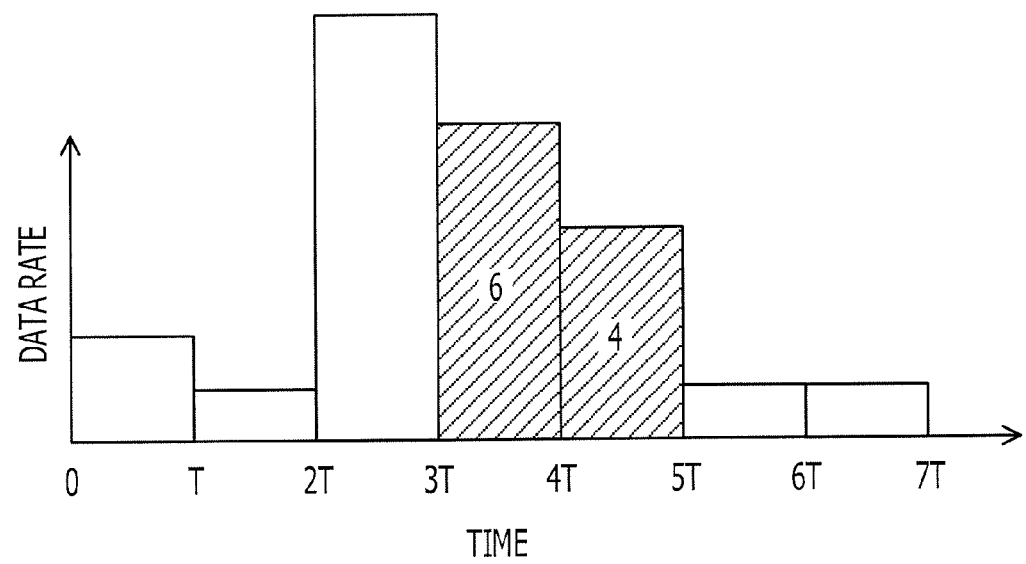

2.2.3 Case in which Download Starting Times are Controlled According to the Second Embodiment FIGS. 11A and 11B illustrate an example of actual data rates at the mobile stations 5a and 5b in a case in which download starting times are controlled according to the second embodiment. In this example, equation (10) above is used as an objective function to control the download starting times so that the sum of the times at which a download is finished at the mobile stations 5a and 5b is minimized.

In this example, when a download at the mobile station 5a is started at time 0 and a download at the mobile station 5b is started at time 3T, the sum of the download finishing times at the mobile stations 5a and 5b is minimized. As a result, the download at the mobile station 5a is finished at time 3T, and a period during which the mobile station 5a continues downloading is 3T. By contrast, the download at the mobile station 5b is finished at time 5T, and a period during which the mobile station 5b continues downloading is 2T.

In comparison with the case in which the download starting time is not controlled, the download finishing time at the mobile station 5a has been improved from 7T to 3T, and the download finishing time at the mobile station 5b has been improved from 6T to 5T. In comparison with the case in which the download starting time is independently controlled for each mobile station, the download finishing time at the mobile station 5a has been improved from 5T to 3T, and the download finishing time at the mobile station 5b has been improved from 6T to 5T. It is also found that the download periods have been also improved.

2.3 Advantageous Effects

When a download occurs at new mobile station $5_{Nu+1}$, only the download starting time at new mobile station $5_{Nu+1}$ is optimized, so the amount of calculation can be reduced when compared with a case in which download starting times $d_1$ to $d_{Nu}$ at mobile stations $5_1$ to $5_{Nu}$ are also recalculated.

In addition, there is no requirement to temporarily suspend a download that has been already started to recalculate download starting times $d_1$ to $d_{Nu}$ at mobile stations $5_1$ to $5_{Nu}$ in the downloading state, suppressing the wireless resource usage efficiency from being lowered.

3. Hardware Structure

Figure 12:
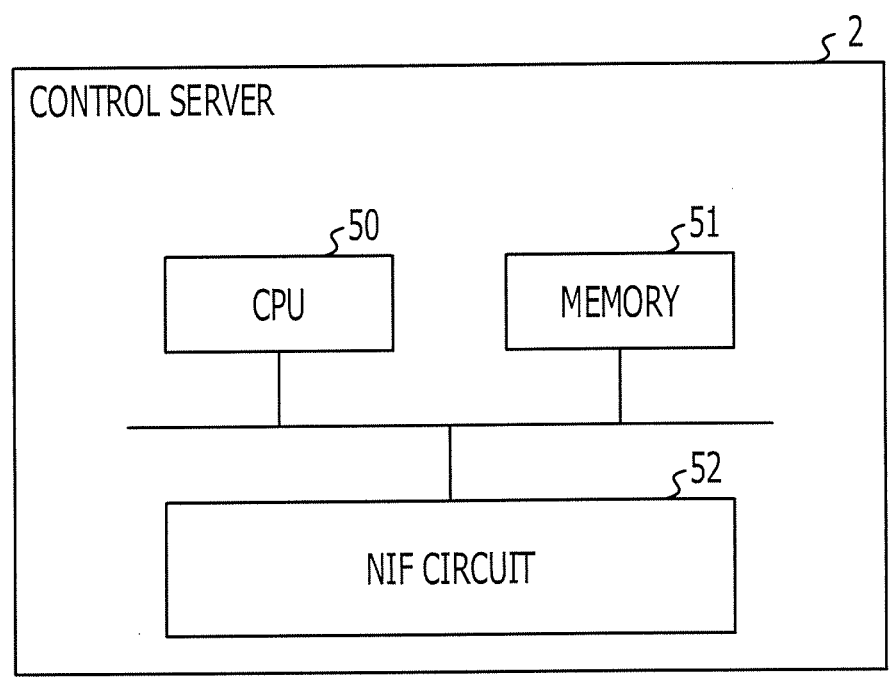
FIG. 12 illustrates an example of the hardware structure of the control server apparatus.

Finally, an example of the structure of hardware that implements the control server 2 and mobile station 5 described above will be described. FIG. 12 illustrates an example of the hardware structure of the control server 2. The control server 2 includes a central processing unit (CPU) 50, a memory 51, and a network interface circuit 52. In FIG. 12, the term network interface is represented as NIF. The memory 51 may include a non-volatile memory, a read-only memory (ROM), a random-access memory (RAM), and other memories that store computer programs and data.

The operations, described above, of the start request receiver 10 and starting time transmitting unit 14 included in the control server 2 illustrated in FIG. 2 are executed when the CPU 50 and NIF circuit 52 cooperate. The operations, described above, of the moving route predicting unit 11, quality estimating unit 12, and starting time calculating unit 13 are executed by the CPU 50.

Figure 13:
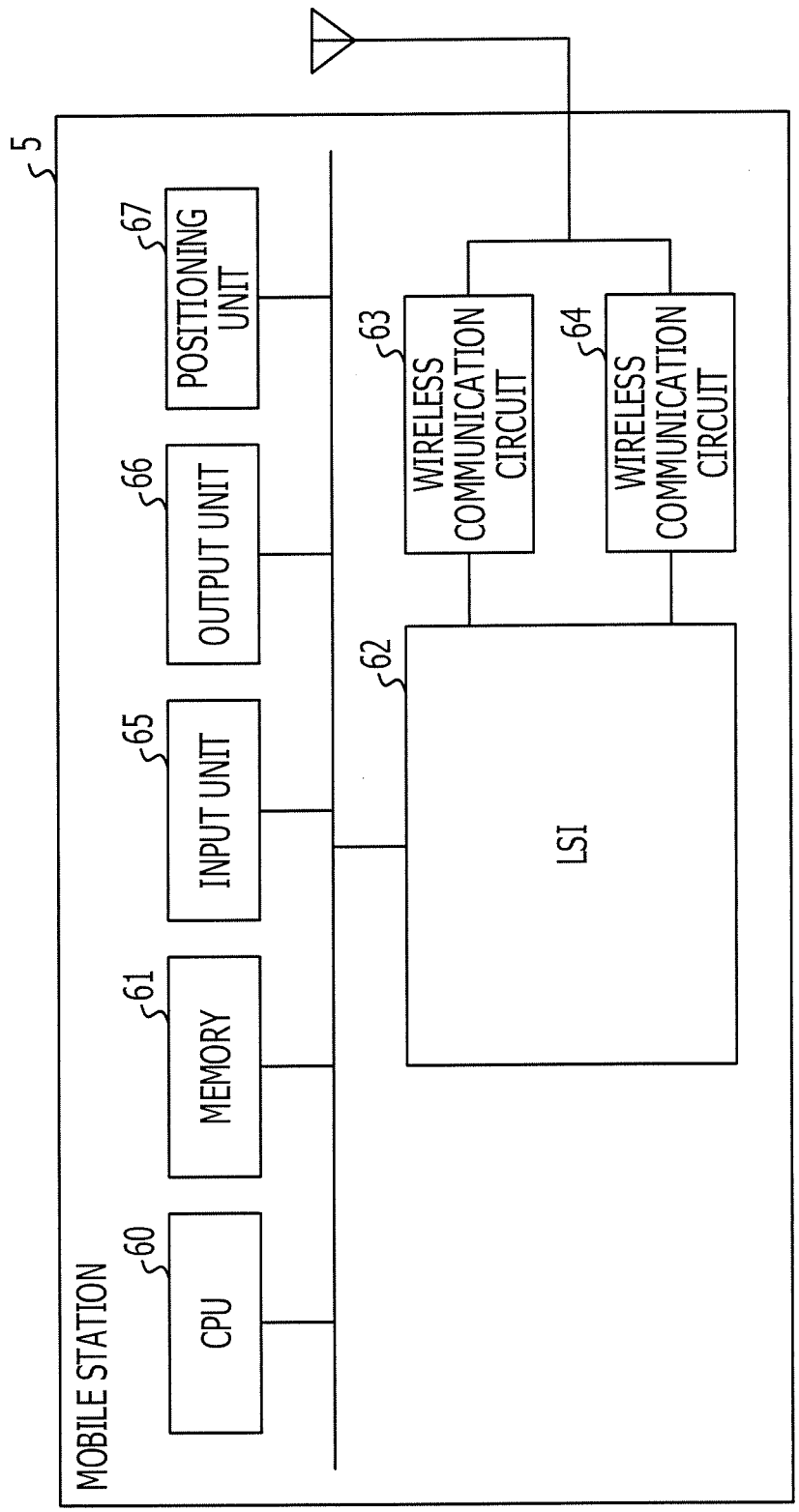
FIG. 13 illustrates an example of the hardware structure of the mobile station apparatus.

FIG. 13 illustrates an example of the hardware structure of the mobile station 5. The mobile station 5 includes a CPU 60, a memory 61, a large-scale integrated (LSI) circuit 62, wireless communication circuits 63 and 64, an input unit 65, an output unit 66, and a positioning unit 67. The memory 61 may include a non-volatile memory, a ROM, and a RAM. The LSI circuit 62 may include a field-programmable gate array (FPGA), an application-specific integrated circuit (ASIC), and a digital signal processor (DSP).

The wireless communication circuit 63 may include an analog-to-digital converting circuit and a frequency converting circuit. The communication circuit 64 may include a digital-to-analog converting circuit and a frequency converting circuit. The input unit 65 may include a keyboard, buttons, a touch panel, a microphone, and other information input devices. The output unit 66 may include a display unit and an audio signal device. The positioning unit 67 may include a GPS device that measures the current position of the mobile station 5 and an inertial navigation device.

The operations, described above, of the receiver 20 and transmitter 21 included in the mobile station 5 illustrated in FIG. 4 are executed by the wireless communication circuits 63 and 64. The operations, described above, of the manipulation accepting unit 22 and content output unit 26 are executed by the input unit 65 and output unit 66, respectively. The operation, described above, of the content controller 23 is executed by the CPU 60. The operation, described above, of the positional information obtaining unit 24 is executed by the positioning unit 67. Data to be retained in the content retaining unit 25 is stored in the memory 61.

The hardware structures illustrated in FIGS. 12 and 13 are only examples used to describe an embodiment. The control server 2 and mobile station 5 described in this description may use any other hardware structures if they execute operations described below.

The functional structures illustrated in FIGS. 2 and 4 are drawn, centered around the functions of the control server 2 and mobile station 5 described in this description. The control server 2 and mobile station 5 may include any structural elements other than the structural elements in FIGS. 2 and 4.

Series of operations described with reference to FIGS. 5 to 7 may be interpreted as methods including a plurality of steps. In this case, an operation may be read as referring to a step.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control apparatus comprising:
a processor configured to:
set a plurality of starting time candidates for each data communication performed by each of a plurality of wireless communication apparatuses respectively,
estimate a plurality of finishing time candidates for each data communication which corresponds to each of the starting time candidates, and
set a starting time for each of the wireless communication apparatuses, wherein each starting time is a time for starting each of the data communications for one selected from the plurality of starting time candidates, and wherein setting each starting time is based on the plurality of starting time candidates, the plurality of finishing time candidates, and each expected data rate for each of the wireless communication apparatuses;
wherein each of the wireless communication apparatuses is configured to receive data during the data communications at the expected data rate and a sum of the finishing time candidates for each of the data communications is minimized.

2. The communication control apparatus according to claim 1,
wherein the processor is further configured to:
estimate each of channel qualities between a base station and each of the wireless communication apparatuses respectively, and
set each of the starting times based on each of the channel qualities.

3. The communication control apparatus according to claim 2,
wherein the processor is further configured to:
predict each of moving routes of each of the wireless communication apparatuses, and
estimate each of the channel qualities based on each of the moving routes.

4. A communication control system comprising:
wireless communication apparatuses; and
a communication control apparatus including
a processor configured to:
set a plurality of starting time candidates for each data communication performed by each of a plurality of wireless communication apparatuses respectively,
estimate a plurality of finishing time candidates for each data communication which corresponds to each of the starting time candidates, and
set a starting time for each of the wireless communication apparatuses, wherein each starting time is a time for starting each of the data communications for one selected from the plurality of starting time candidates, and wherein setting each starting time is based on the plurality of starting time candidates, the plurality of finishing time candidates, and each expected data rate for each of the wireless communication apparatuses;
wherein each of the wireless communication apparatuses is configured to receive data during the data communications at the expected data rate and a sum of the finishing time candidates for each of the data communications is minimized.

5. A communication control method comprising:
setting a plurality of starting time candidates for each data communication performed by each of a plurality of wireless communication apparatuses respectively,
estimating a plurality of finishing time candidates for each data communication which corresponds to each of the starting time candidates, and
setting a starting time for each of the wireless communication apparatuses, wherein each starting time is a time for starting each of the data communications for one selected from the plurality of starting time candidates, and wherein setting each starting time is based on the plurality of starting time candidates, the plurality of finishing time candidates, and each expected data rate for each of the wireless communication apparatuses;
wherein each of the wireless communication apparatuses is configured to receive data during the data communications at the expected data rate and a sum of the finishing time for each of the data communications is minimized.

6. The communication control apparatus according to claim 1,
wherein the processor is configured to perform, for setting the starting time for each of the wireless communication apparatuses, an optimization by using an objective function to minimize a completion time of the data communication for the plurality of wireless communication apparatuses.

7. The communication control apparatus according to claim 6,
wherein the objective function is comprises a sum of the finishing time candidates.

8. The communication control apparatus according to claim 6,
wherein the processor is further configured to perform the optimization by using the objective function for an optimization problem,
the objective function comprises a sum of communication periods, and
each of the communication periods is a period between the starting time candidates and each of the finishing time candidates respectively.

9. The communication control apparatus according to claim 6,
wherein the processor is further configured to perform the optimization by using the objective function for an optimization problem, and
the objective function is a product of element functions, and
each of the element functions is 0 when each of differences between each of the finishing time candidates and a specified threshold value is equal to or less than 0, and is a monotone increasing function when each of the differences is more than 0.

10. The communication control apparatus according to claim 6,
wherein the processor is further configured to, after starting at least one of the communications in accordance with the starting time, set a next starting time candidate for a next data communication performed by a next wireless communication apparatus,
estimate a next finishing time candidates for the next data communication which corresponds to the next starting time candidate, and
set a next starting time when the next wireless communication apparatus is to start the next data communication to the next starting time candidate, by performing an optimization of the next finishing time candidates.

11. The communication control apparatus according to claim 6,
wherein the completion time of the data communication is determined based on a minimized sum of completion times for the plurality of wireless communication apparatuses.

12. The communication control apparatus according to claim 6,
wherein the objective function is based upon an iterative function which dynamically adjusts starting time candidates and respective finishing time candidates so as to minimize a sum of completion times for the plurality of wireless communication apparatuses.

13. The communication control apparatus according to claim 12,
wherein setting the starting time comprises comparing the finishing time candidates and selecting the starting time in which the corresponding finishing time candidates occurs earliest.

14. The communication control apparatus according to claim 6,
wherein the completion time of the data communication is determined based on a combined completion time for the plurality of wireless communication apparatuses.

* * * * *